(12) United States Patent
Naito

(10) Patent No.: US 8,201,958 B2
(45) Date of Patent: Jun. 19, 2012

(54) BACKLIGHT ASSEMBLY AND CONNECTOR USED THEREFOR

(75) Inventor: Takeharu Naito, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 329 days.

(21) Appl. No.: 12/448,992

(22) PCT Filed: Jun. 19, 2008

(86) PCT No.: PCT/JP2008/061191
§ 371 (c)(1),
(2), (4) Date: Jul. 17, 2009

(87) PCT Pub. No.: WO2008/156128
PCT Pub. Date: Dec. 24, 2008

(65) Prior Publication Data
US 2010/0008065 A1 Jan. 14, 2010

(30) Foreign Application Priority Data

Jun. 21, 2007 (JP) .................................. 2007-163396

(51) Int. Cl.
*G09F 13/04* (2006.01)
(52) U.S. Cl. .................... 362/97.1; 362/97.2; 362/97.4; 362/634; 439/226; 439/232
(58) Field of Classification Search ................. 362/97.1, 362/97.2, 97.4, 634; 431/226, 232
See application file for complete search history.

(56) References Cited

U.S. PATENT DOCUMENTS

| | | | |
|---|---|---|---|
| 6,685,512 B2 | 2/2004 | Ooya | |
| 6,908,326 B2 | 6/2005 | Shiota et al. | |
| 7,344,397 B2 | 3/2008 | Miyazono | |
| 7,530,828 B2 | 5/2009 | Miyazono | |
| 7,540,750 B2 | 6/2009 | Miyazono | |
| 7,607,805 B2 * | 10/2009 | Kwon et al. | 362/378 |
| 7,771,106 B2 * | 8/2010 | Yang et al. | 362/634 |
| 2006/0279957 A1 | 12/2006 | Kwon et al. | |
| 2007/0230169 A1 | 10/2007 | Kwon et al. | |
| 2007/0286629 A1 | 12/2007 | Kwon et al. | |

(Continued)

FOREIGN PATENT DOCUMENTS

CN  1581593  2/2005

(Continued)

OTHER PUBLICATIONS

International Search Report.

(Continued)

*Primary Examiner* — Evan Dzierzynski
(74) *Attorney, Agent, or Firm* — Collard & Roe, P.C.

(57) ABSTRACT

To provide a backlight assembly for a liquid crystal panel, which aims to establish electrical connection between a fluorescent tube (CCFL tube) and an inverter substrate and which is low in cost and improved in assembling operability. A connector 10a includes a contact 2 and a housing 1 holding the contact 2. The contact 2 includes a holding portion held by the housing 1, a first connecting portion 18 connected to a connecting portion 51 of the fluorescent tube, and a second connecting portion 19 connected to the substrate. The first connecting portion 18 is formed from one end of the holding portion through a floating portion. The second connecting portion 19 is formed from the other end of the holding portion.

8 Claims, 20 Drawing Sheets

U.S. PATENT DOCUMENTS

2008/0080182 A1 4/2008 Yang et al.

FOREIGN PATENT DOCUMENTS

| | | |
|---|---|---|
| CN | 1925225 | 3/2007 |
| JP | 07-262910 | 10/1995 |
| JP | 09-17329 | 1/1997 |
| JP | 2000-123604 | 4/2000 |
| JP | 2002-216914 | 8/2002 |
| JP | 2004-294592 | 10/2004 |
| JP | 2005-158585 | 6/2005 |
| JP | 2006-344602 | 12/2006 |
| JP | 2007-280955 | 10/2007 |
| JP | 2007-317664 | 12/2007 |
| JP | 2008-084867 | 4/2008 |
| JP | 2008-204657 | 9/2008 |
| JP | 2008-300145 | 12/2008 |
| TW | 200719538 | 5/2007 |

OTHER PUBLICATIONS

Taiwanese Office Action in Taiwan Application No. 097122981 dated Dec. 13, 2011, with English translation of relevant part.

\* cited by examiner (a)

(b)

BACKLIGHT ASSEMBLY AND CONNECTOR USED THEREFOR

CROSS REFERENCE TO RELATED APPLICATIONS

This application is the National Stage of PCT/JP2008/061191 filed on Jun. 19, 2008, which claims priority under 35 U.S.C. §119 of Japanese Application No. 2007-163396 filed on Jun. 21, 2007. The international application under PCT article 21(2) was not published in English.

TECHNICAL FIELD

This invention relates to a backlight connector and a backlight assembly using the same and, in detail, to a backlight connector for a liquid crystal panel of a liquid crystal television or the like, and a backlight assembly using the same.

BACKGROUND ART

Conventionally, a fluorescent tube used in a backlight of the type includes a lamp formed of a glass tube and a Dumet wire led out from an electrode of the lamp.

As a connector used for connection of the conventional fluorescent tube, there are known connectors shown in Patent Documents 1 and 2.

A lamp connecting member (connector) disclosed in Patent Document 1 comprises a contact fixed to a frame. The contact comprises a generally-H-shaped planar electrode portion, a hole-shaped electrode portion formed at the center, arc-shaped electrode portions formed on opposite sides thereof, and a pair of arms connected to the arc-shaped electrode portions and bent to extend downward, respectively. The pair of arms have middle portions which are first narrow-spaced from each other and then formed into arc shapes. Thus, between the middle portions of the pair of arms, a circular space is formed as a lamp holding portion. Further, the arms have end portions opened from each other.

A cylindrical-shaped input terminal of the lamp, for example, a Dumet wire can be fitted to the lamp holding portion through the end portions of the pair of arms, which are opened from each other. When the input terminal of the lamp is removed, the input terminal can easily be removed by applying a force so that the fluorescent lamp is separated from the lamp connecting member. Thus, the lamp connecting member has a structure which allows the lamp to be easily fitted to and removed from the lamp connecting member.

In the connector shown in Patent Document 2, a fluorescent tube has a Dumet wire having an end formed into a spherical shape. The fluorescent tube is fixed to a lamp holder and supplied with a power supply voltage from the outside via the lamp holder to emit light. The lamp holder includes a power supply member for applying a power supply voltage to the fluorescent tube. The power supply member has a power supply terminal to be connected to the Dumet wire of the fluorescent tube. The power supply terminal has a ring shape opened at one side. By a spherical portion of the Dumet wire, the fluorescent tube is prevented from being removed from the power supply terminal in a direction along the length of the lamp.

However, the connector shown in Patent Document 2 requires a parts cost for a holder cap and a coupling plate. Further, after insertion of the lamp (CCFL tube), many-hours are required for operations of fitting the holder cap of the connector in order to ensure a contact force and of inserting the connector into the coupling plate and fixing the coupling plate to a sheet metal.

It is assumed that a θ error occurs during mounting of the connector and during fixing of a substrate. In this event, because a connecting portion is formed of the Dumet wire, a glass portion at a base of the Dumet wire 53 is directly loaded. This may possibly cause glass breakage.

Further, when the lamp is replaced, removal of the lamp becomes difficult and, therefore, it is inevitable to replace other parts also.

Furthermore, in Patent Document 2, a cap is embedded to be forcibly contacted with a contact. With this structure, a parts cost for the cap and an operation of fitting the cap are added.

In a connector shown in Patent Document 3, a cap-like ferrule is fitted to each of opposite ends of a W-shaped fluorescent tube. Walls of the fluorescent tube to which the ferrules are fitted are fixed with a silicone adhesive. Dumet wires as both terminals of the fluorescent tube are led out through the ferrules and then soldered to outer surfaces of the ferrules.

The fluorescent tube is held by a reflecting plate and contacts as a holding member. The contacts of the same shape are arranged, one on a high-voltage side of the fluorescent tube and the other on a ground side thereof. Each of the contacts has a pair of flanges of the same shape, which have a spring characteristic so that the ferrule formed at each of the opposite ends of the fluorescent tube is sandwiched and held on both sides in a direction orthogonal to a longitudinal direction of the fluorescent tube. Each of the contacts has an additional pair of flanges which protrude toward a side opposite to the above-mentioned flanges so as to face each other in the longitudinal direction of the fluorescent tube and each of which is provided with a leaf spring extending from its end in an oblique direction to prevent removal. The additional pair of flanges are inserted into two parallel elongate holes, respectively, which are formed in a backlight substrate.

In the connector in Patent Document 3, for the purpose of fixing the contact to the substrate, it is required to insert a part of the contact into the substrate and to perform soldering. Accordingly, correction of a positioning error between the substrate and the fluorescent tube is difficult. In addition, designing and assembling processes are difficult.

Further, after a lamp of the fluorescent tube is inserted into the ferrule and fixed thereto with the adhesive and the Dumet wire is bonded to the ferrule, it is required to bend the Dumet wire which is led out and to solder the Dumet wire to the ferrule. This process requires many-hours, resulting in a high cost.

Patent Document 1: JP-A-2004-294592
Patent Document 2: JP-A-2006-344602
Patent Document 3: JP-A-2000-123604

DISCLOSURE OF THE INVENTION

Problem to be Solved by the Invention

It is therefore a technical object of the present invention to provide a backlight assembly for a liquid crystal panel, which aims to establish electrical connection between a fluorescent tube (CCFL tube) and an inverter substrate and which is low in cost and is improved in assembling operability.

Means to Solve the Problem

According to one aspect of the present invention, there is provided a backlight assembly which includes a fluorescent tube having a connecting portion; a connector connected to the connecting portion of the fluorescent tube; a substrate connected to the connector; and a casing holding the connector. In the backlight assembly, the connector includes a contact and a housing holding the contact. The contact includes a holding portion held by the housing; a first connecting portion connected to the connecting portion of the fluorescent tube; and a second connecting portion connected to the substrate. The first connecting portion is formed from one end of the holding portion through a floating portion and the second connecting portion is formed from the other end of the holding portion.

In the aspect of the present invention, it is preferable that, in the backlight assembly, the casing includes a sheet metal and a support base, the connector is held in a loosely-fitted state by the sheet metal and the support base, the first connecting portion includes a pair of spring portions, and the pair of spring portions have a shape which enables positioning of the fluorescent tube.

In the aspect of the present invention, it is more preferable that in the backlight assembly, the second connecting portion includes a pair of spring portions, each of the spring portions comprises a contact point and a fixed end, and the spring portions are different from each other in width of a part from the contact point to the fixed end.

According to another aspect of the present invention, there is provided a connector which is for use in connecting a fluorescent tube and a substrate and which includes a contact and a housing holding the contact. In the connector, the contact includes a holding portion held by the housing; a first connecting portion connected to a connecting portion of the fluorescent tube; and a second connecting portion connected to the substrate. The first connecting portion is formed from one end of the holding portion through a floating portion and the second connecting portion is formed from the other end of the holding portion.

In the aspect of the present invention, it is preferable that, in the connector, the first connecting portion includes a pair of spring portions, and the pair of spring portions have a shape which enables positioning of the fluorescent tube.

In the aspect of the present invention, it is preferable that, in the connector, the second connecting portion includes a pair of spring portions, each of the spring portions includes a contact point and a fixed end, and the spring portions are different from each other in width of a part from the contact point to the fixed end.

BEST MODE FOR EMBODYING THE INVENTION

Before describing embodiments of the present invention, for the purpose of facilitating understanding of the present invention, backlight assemblies according to conventional technologies will be described with reference to FIGS. 1 through 6.

Figure 1:
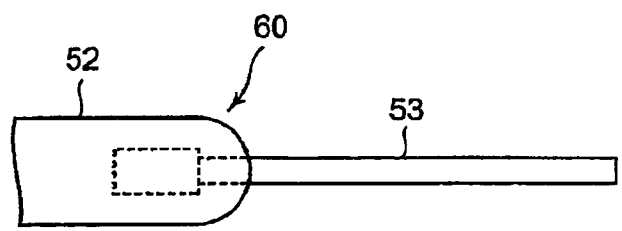
FIG. 1 is a partial view showing an end portion of one example of a conventional fluorescent tube.

Referring to FIG. 1, a fluorescent tube 60 comprises a lamp 52 formed of a glass tube and a Dumet wire 53 led out from an electrode of the lamp. As a connector used for connection of such a conventional fluorescent tube 60, there are known connectors shown in FIG. 2 (see Patent Document 1) and FIG. 3 (see Patent Document 2).

Figure 2:
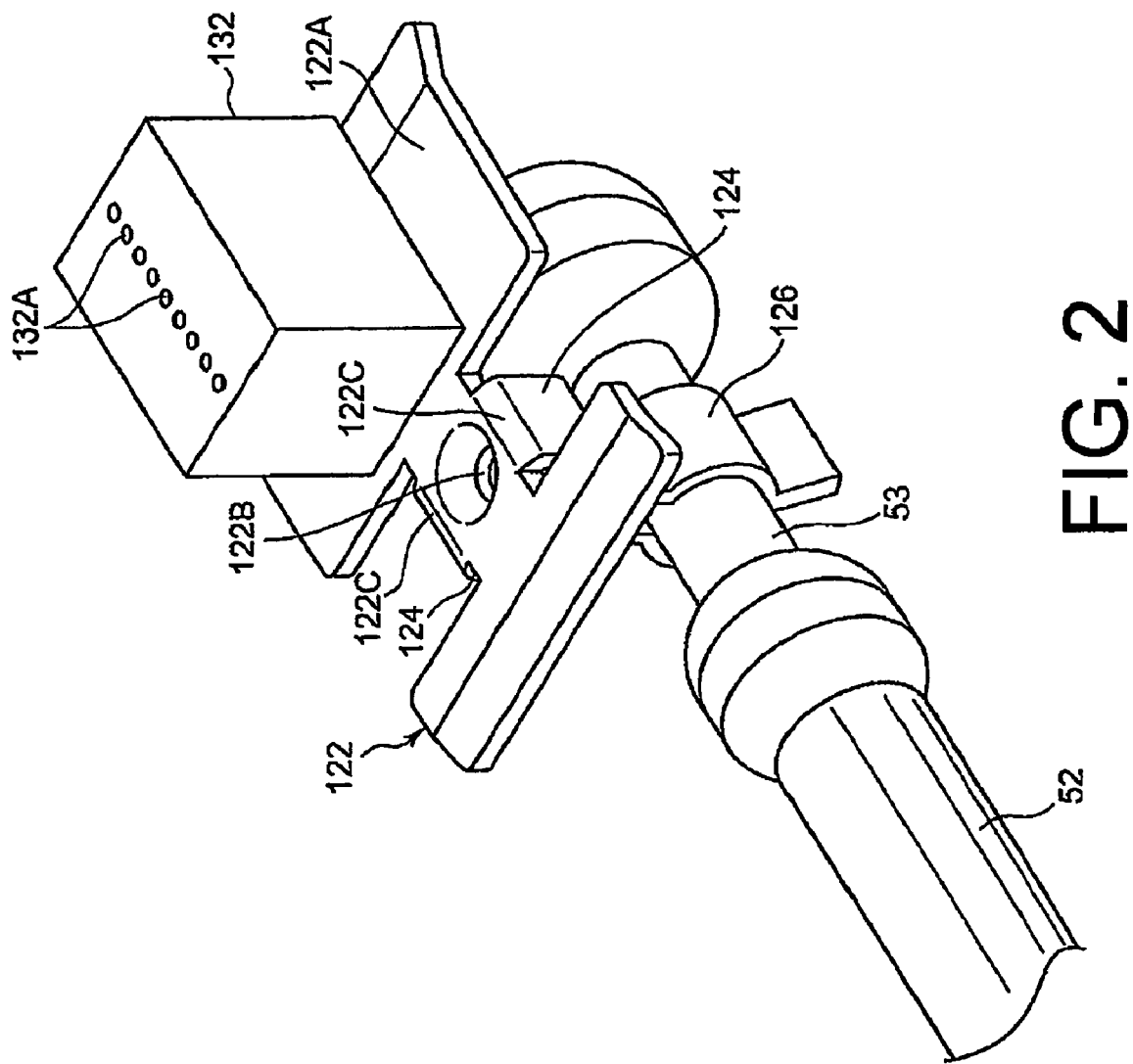
FIG. 2 is a perspective view showing a connector disclosed in Patent Document 1.

Referring to FIG. 2, a lamp connecting member (connector) 122 disclosed in Patent Document 1 has right and left ends each of which is press-fitted into a groove portion of a recessed portion formed on a frame which is not shown in the figure. Thus, the lamp connecting member is fixed to the frame. The lamp connecting member 122 comprises a contact and has a generally-H-shaped planar electrode portion 122A, a hole-shaped electrode portion 122B formed at the center, and arc-shaped electrode portions 122C formed on opposite sides thereof. A pair of arms 124 are connected to the arc-shaped electrode portions 122C and bent to extend downward, respectively. The pair of arms 124 have middle portions which are first narrow-spaced from each other and then formed into arc-shapes. Thus, between the middle portions of the pair of arms, a circular space is formed as a lamp holding portion 126. Further, the pair of arms 124 have end portions opened from each other.

A cylindrical-shaped input terminal of the lamp 52, for example, the Dumet wire 53 can be fitted to the lamp holding portion 126 through the end portions of the pair of arms 124, which are opened from each other. When the input terminal 53 of the lamp 52 is removed, the input terminal can easily be removed by applying a force so that the fluorescent lamp 52 is separated from the lamp connecting member 122. Thus, the lamp connecting member has a structure which allows the lamp 52 to be easily fitted to and removed from the lamp connecting member 122.

On the planar electrode portion 122A, a rubber connector 132 is placed which is a connector member formed into a rectangular solid and having elasticity and conductivity. Inside the rubber connector 132, a plurality of metal wires 132A are contained and equally spaced from each other to ensure conductivity.

Figure 3:
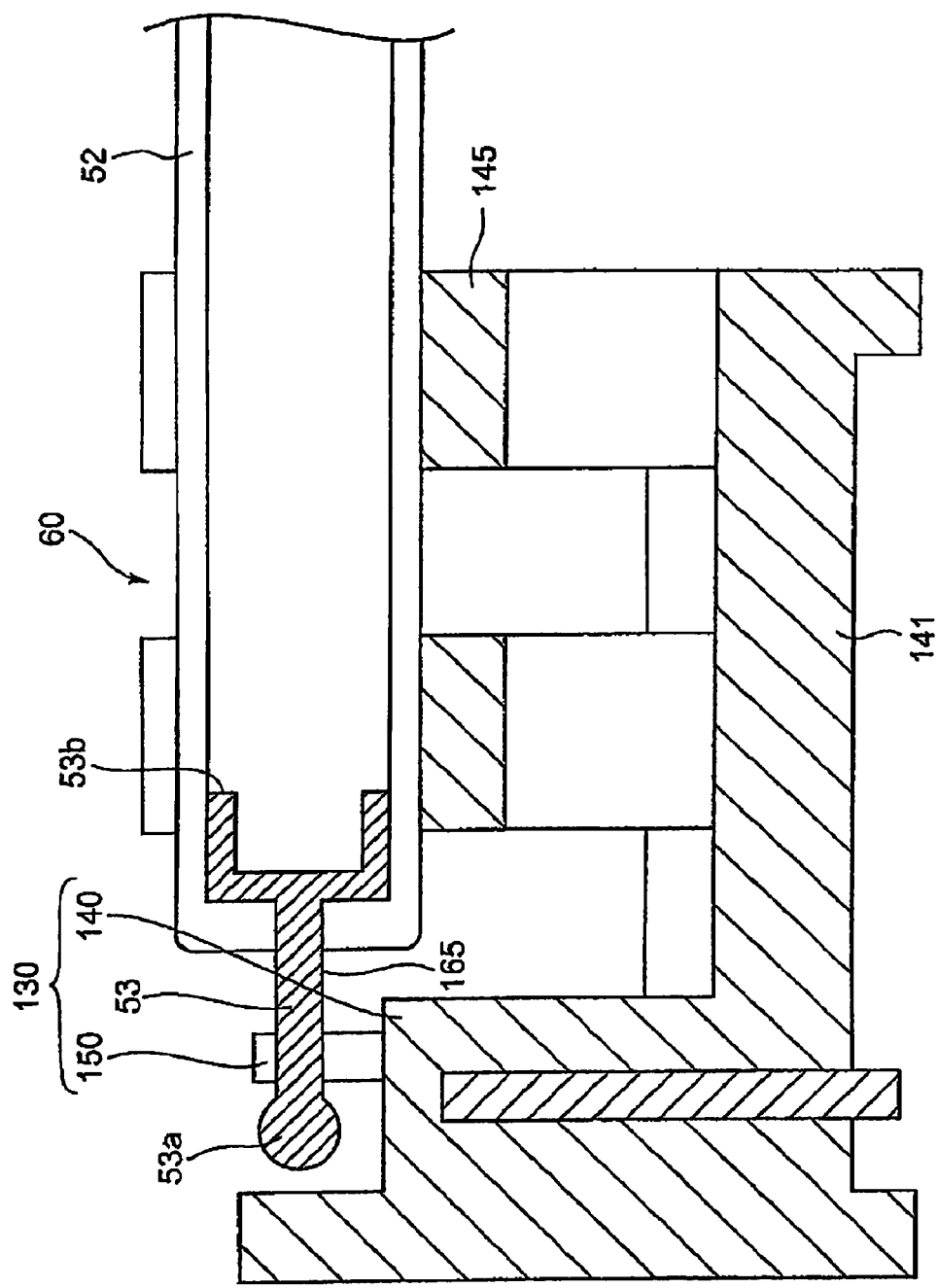
FIG. 3 is a sectional view showing a connector disclosed in Patent Document 2.

Referring to FIG. 3, a fluorescent tube 60 shown in Patent Document 2 is fixed to a lamp holder 130. The lamp holder 130 guides and fixes one end portion of the fluorescent tube 60 and is electrically connected to the fluorescent tube 60 to apply a power supply voltage to the fluorescent tube 60. The lamp holder 130 includes a holder main body 140 and a power supply member 150. The holder main body 140 includes a bottom portion 141 and a lamp supporting portion 145. The lamp supporting portion 145 is extended from the bottom portion 141. At an upper portion of the lamp supporting portion 145, a lamp guiding groove is formed in which an end portion of the fluorescent tube 60 is disposed.

The power supply member 150 is disposed so as to penetrate from an upper portion of the holder main body 140 to the bottom portion 141 of the holder main body 140. The power supply member 150 has a part protruding from the bottom portion 141, which part is defined as a connecting terminal. The power supply member 150 has another part connected to the connecting terminal and protruding from the upper portion of the holder main body 140, which part is defined as a power supply terminal. The power supply terminal has a ring shape opened at one side.

Supplied with a power supply voltage from the outside through the lamp holder 130, the fluorescent tube 60 emits light. As described above, the fluorescent tube 60 includes the lamp 52, an electrode 53b, and a lead wire (the Dumet wire) 53.

An end portion of the lamp 52 is guided by the lamp guiding groove formed on the holder main body 140.

The Dumet wire 53 electrically connects the electrode 53b and the power supply member 150. Specifically, the Dumet wire 53 includes a coupling portion 165 and a removal preventing portion 53a. The coupling portion 165 is extended from the electrode 53b to the outside of the lamp 52 and connected to the power supply terminal. The removal preventing portion 53a is formed at an end portion of the coupling portion 165.

With reference to a direction perpendicular to a length direction of the lamp 52, the removal preventing portion 53a has a first sectional area greater than a second sectional area of the coupling portion 165. The removal preventing portion 53a has a spherical shape having a diameter greater than that of the coupling portion 165. Accordingly, the removal preventing portion 53a prevents the lead wire 53 from being removed from the power supply terminal in the length direction of the lamp 52.

However, the connector shown in FIG. 2 requires a parts cost for a holder cap and a coupling plate. Further, after insertion of the lamp (CCFL tube) 52, many-hours are required for operations of fitting the holder cap of the connector in order to ensure a contact force and of inserting the connector into the coupling plate and fixing a sheet metal of the coupling plate.

It is assumed that a θ error occurs during mounting of the connector and during fixing of a substrate. In this event, because a connecting portion is formed of the Dumet wire, a glass portion at a base of the Dumet wire 53 is directly loaded. This may possibly cause glass breakage.

Further, when the lamp is replaced, removal of the lamp becomes difficult and, therefore, it is inevitable to replace other parts also.

Furthermore, in Patent Document 2, a cap is embedded to be forcibly brought into contact with a contact. With this structure, a parts cost for the cap and an operation of fitting the cap are added.

On the other hand, Patent Document 3 has a structure in which a ferrule 51 is fitted to a fluorescent tube 55.

Figure 4:
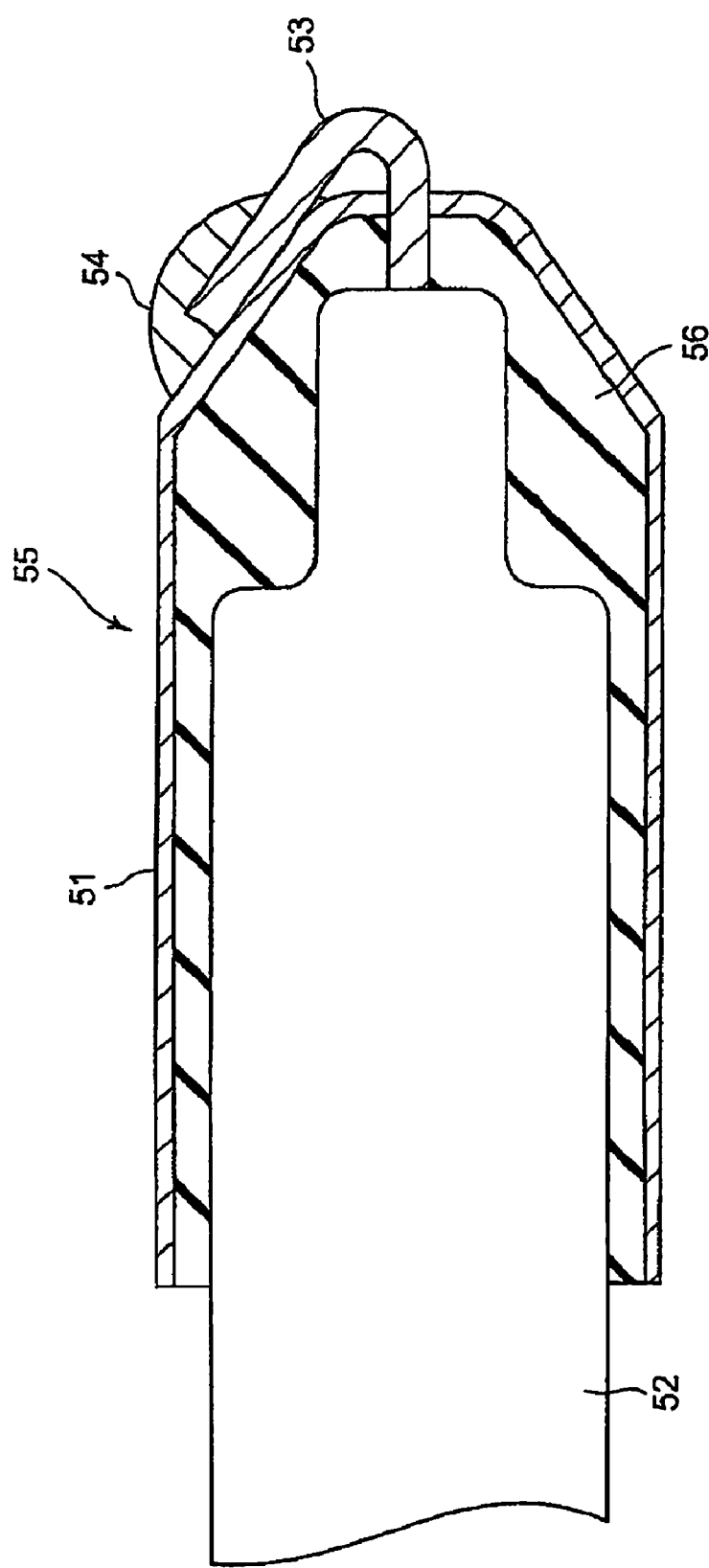
FIG. 4 is a sectional view showing a fluorescent tube shown in Patent Document 3.

Referring to FIG. 4, the ferrule 51 is fitted to each of opposite ends of the fluorescent tube 55 of a W shape. The fluorescent tube 55 to which the ferrules 51 are fitted is fixed with a silicone adhesive 56. To outer surface portions of the ferrules 51, Dumet wires 53 as both terminals of the fluorescent tube 55 are fixed by a solder 54. The fluorescent tube 55 is held by a reflecting plate not shown in the figure and contacts 105 as a holding member. A positional relationship between the reflecting plate and the contacts 105 is determined by mounting the two holding members 105 to a backlight substrate and fixing the backlight substrate to the reflecting plate.

Figure 5:
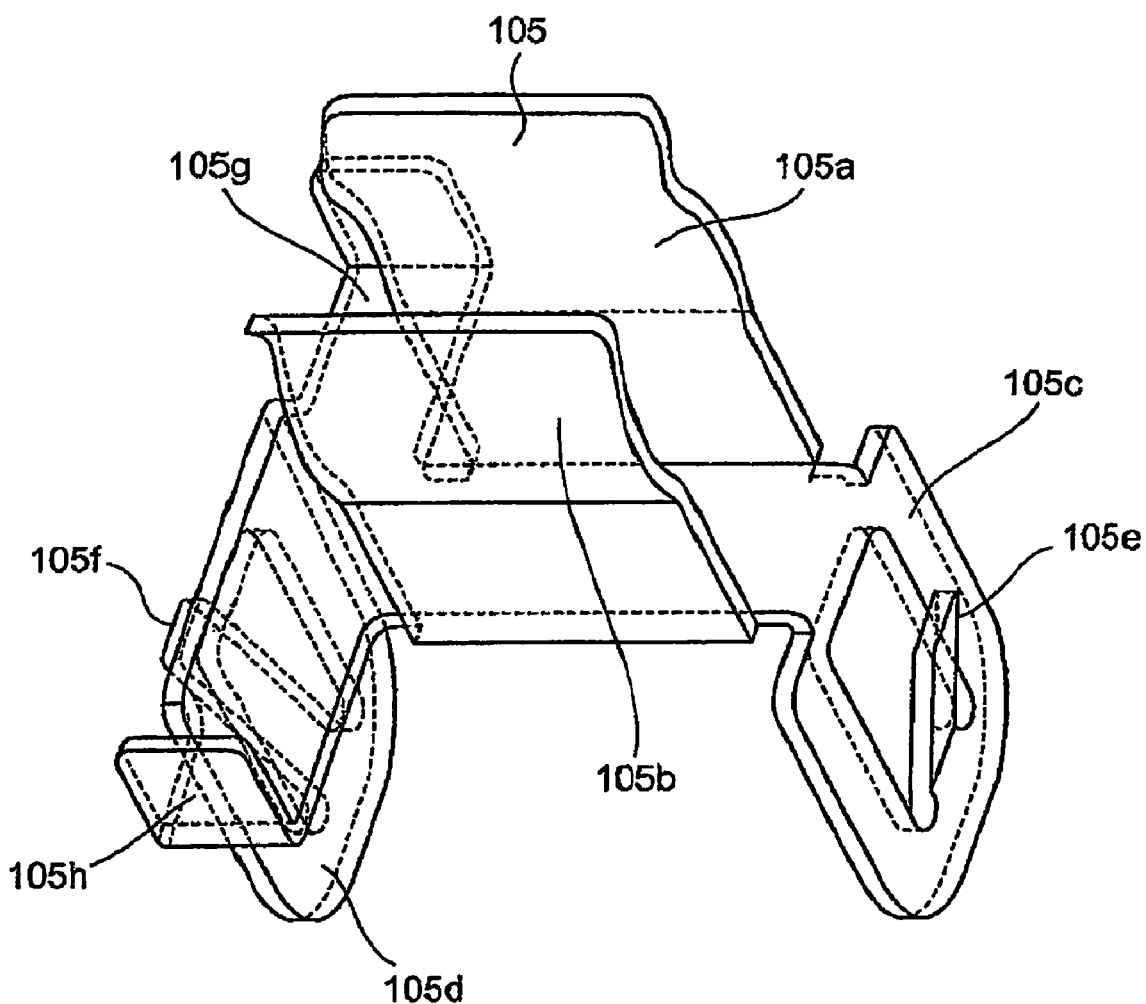
FIG. 5 is a perspective view of a contact for connecting the fluorescent tube in FIG. 4.

Referring to FIG. 5, the contacts 105 holding the fluorescent tube 55 have the same shape and are arranged, one on a high-voltage side of the fluorescent tube 55 and the other on a ground side thereof.

Each of the contacts 105 is provided with first flanges 105a and 105b of the same shape for holding the fluorescent tube 55 (see FIG. 4). Each of the first flanges 105a and 105b has a shape obtained by bending an end portion of the flange to have a diameter adapted to an outside diameter of the ferrule 51 formed at each of the opposite ends of the fluorescent tube 55. Further, the entire flange has a spring characteristic so that the ferrule 51 formed at each of the opposite ends of the fluorescent tube 55 is sandwiched and held on both sides in a direction orthogonal to a longitudinal direction of the fluorescent tube 55. With this structure, the fluorescent tube 55 is not released from the contact 105. Further, the contact 105 has second flanges 105c and 105d which extend in a direction opposite to an extending direction of the first flanges 105a and 105b and which face each other in a direction orthogonal to a facing direction of the first flanges 105a and 105b. The second flanges 105c and 105d are provided with leaf springs 105e and 105f extending from their ends in oblique directions, respectively.

Figure 6:
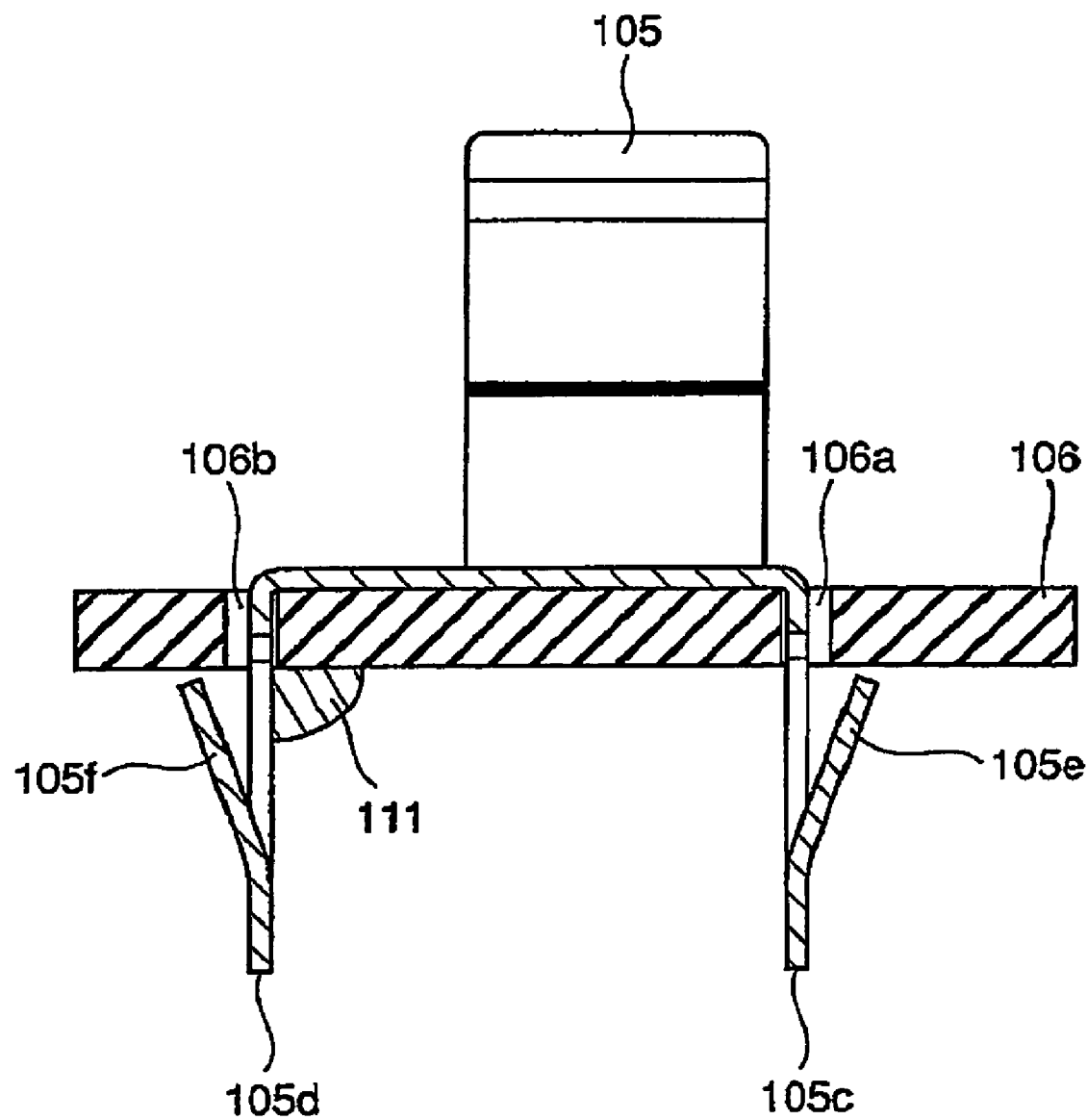
FIG. 6 is a sectional view when the contact in FIG. 5 is mounted to a substrate.

As shown in FIG. 6, the backlight substrate 106 is provided with two parallel elongate holes 106a and 106b extending in a direction orthogonal to a longitudinal direction of the W-shaped fluorescent tube 55. Into the two parallel elongate holes 106a and 106b, the flanges 105c and 105d of the contact 105 are inserted, respectively. When the flanges 105c and 105d of the contact 105 are inserted into the elongate holes 106a and 106b of the backlight substrate 106, respectively, ends of the leaf springs 105e and 105f are engaged with a planar portion of the backlight substrate 106 to be held. Also, for the purpose of preventing rotation of the contact 105, the flanges 105c and 105d of the contact 105 are inserted into the two parallel elongate holes 106a and 106b, respectively.

In the connector in Patent Document 3, for the purpose of fixing the contact 105 to the substrate 106, it is required to insert a part of the contact 105 into the substrate 106 and to perform soldering. Accordingly, correction of a positioning error between the substrate 106 and the fluorescent tube 55 is difficult. In addition, designing and processes are difficult. Further, after the lamp 52 of the fluorescent tube 55 is inserted into the ferrule 51 and fixed with the adhesive and the Dumet wire 53 is bonded to the ferrule 51, it is required to bend the Dumet wire 53 which is led out and to solder the wire to the ferrule 51. This process requires man-hours, resulting in a high cost.

Now, embodiments of the present invention will be described with reference to the drawing.

First Embodiment

Figure 7:
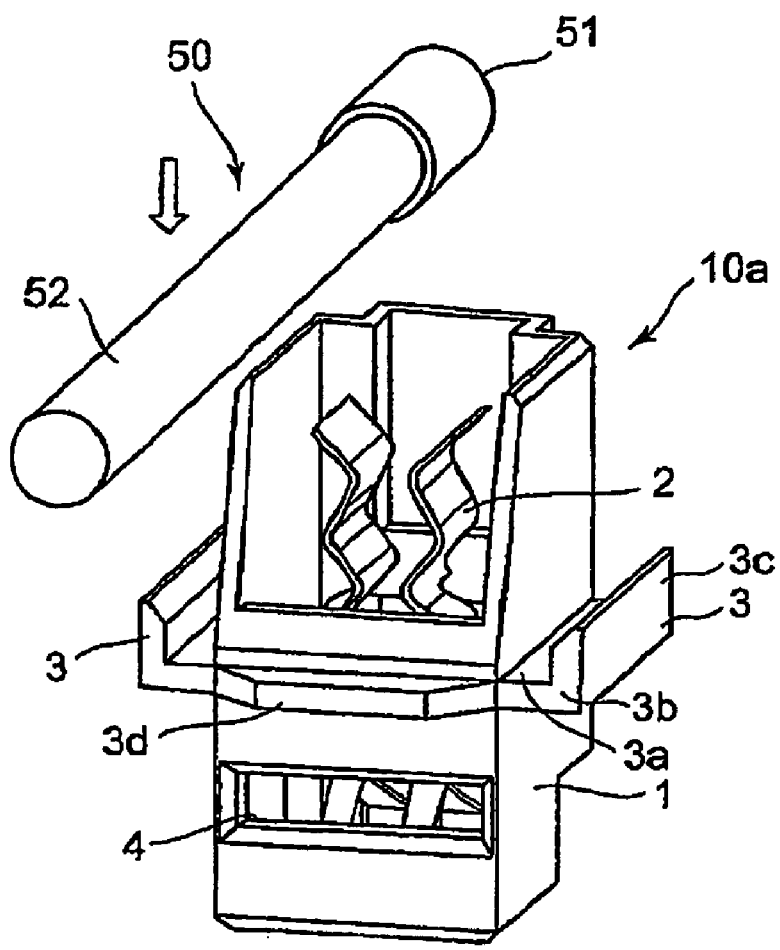
FIG. 7 is a perspective view showing a structure of a connector according to an embodiment of the present invention.

Referring to FIG. 7, a connector 10a according to a first embodiment of the present invention has a housing 1 formed of an insulating material having a high thermal resistance (approximately 160° C.) in view of heat buildup of an electrode portion of a lamp 52, and a metal contact 2 having an excellent conductivity. The metal contact 2 is used for connection between a fluorescent tube (CCFL tube) 50 and an inverter substrate 40 (see FIGS. 13, 14, and 15). The fluorescent tube 50 has one end which is inserted into one end of the contact. As will later be described, the inverter substrate 40 is inserted into an insertion opening 4 opened at a lower portion of the connector so as to be brought into contact with the other end of the contact.

Figure 8:
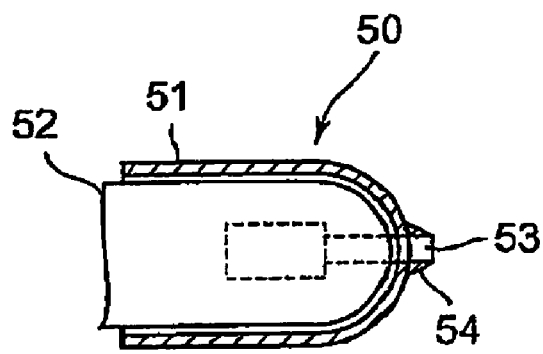
FIG. 8 is a sectional view showing an end portion of a fluorescent tube used in the connector in FIG. 7.

Referring to FIG. 8, the fluorescent tube 50 comprises the lamp 52, a Dumet wire 53 led out from the inside of the lamp 52, and a ferrule 51 formed of a metal cap having a U-shaped section and covering one end of the lamp 52 as a connecting portion. The ferrule 51 has one end provided with a through hole for the Dumet wire 53 to pass therethrough. The Dumet wire 53 is led out from the through hole to the outside of the ferrule 51 and electrically connected to the ferrule 51 by soldering (fixation through a soldering portion 54) or mechanical connection, such as press-contacting. The ferrule 51 and the Dumet wire 53 may be connected also by press-fitting, laser welding, or the like.

Figure 9:
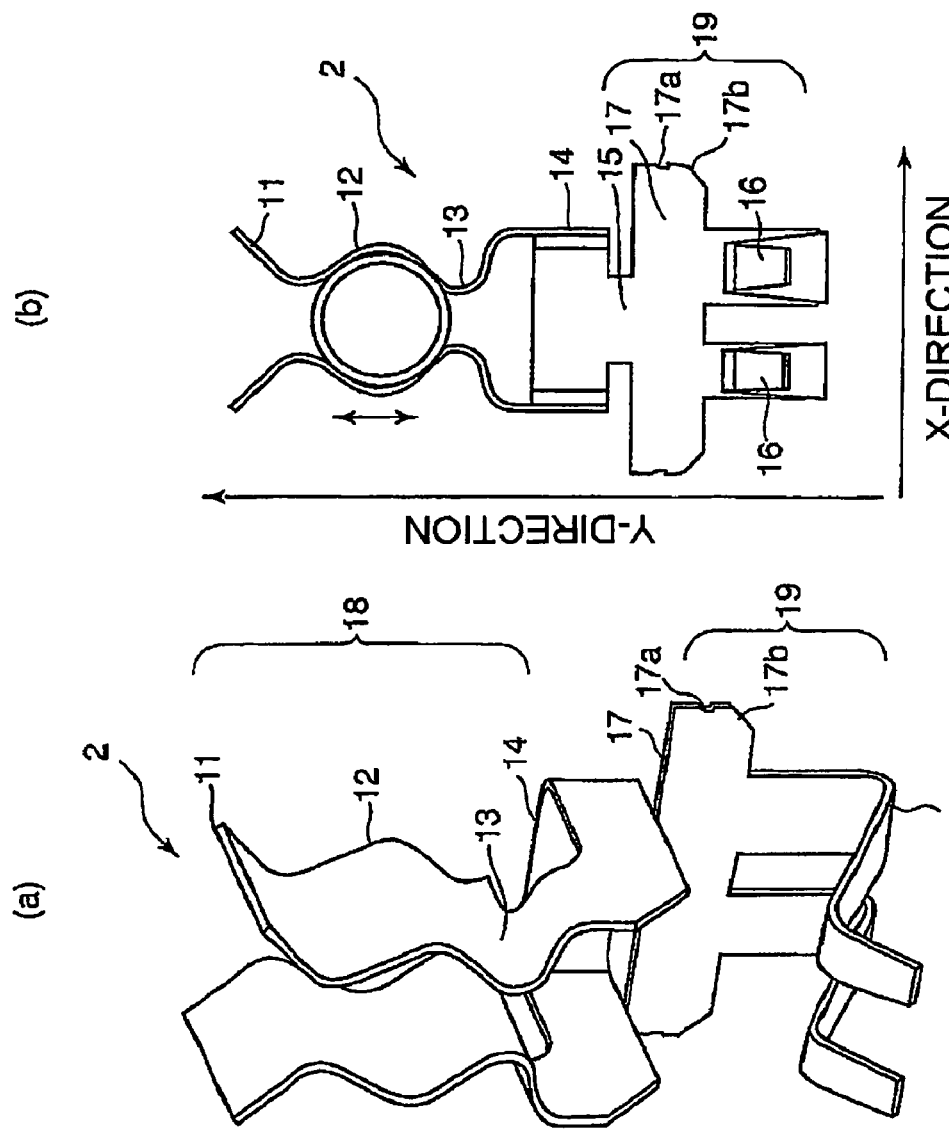
FIG. 9 shows (a) a perspective view of a contact 2 in FIG. 7 and (b) a front view of the contact in FIG. 7.

FIG. 9 (a) is a perspective view showing the contact 2 in FIG. 7 and FIG. 9 (b) is a front view of the contact in FIG. 7.

Referring to FIG. 9 (a), (b), the contact 2 is provided with a lamp-side connecting portion 18 formed of a pair of metal pieces extending from end portions of a U-shaped base portion 14 and facing each other.

The lamp-side connecting portion 18 as a first connecting portion has end portions 11 comprising a pair of metal pieces shaped so as to guide the ferrule 51 at the one end of the fluorescent tube 50, first spring portions 12 connected to the end portions and protruding outward away from each other in an L shape (mountain shape), and second spring portions 13 bent inward toward each other in an L shape (valley shape). The second spring portions 13 are connected to the lamp-side base portion 14. From the center of the lamp-side base portion 14, a floating portion 15 comprising a plate piece extends downward. Further, an inverter-side connecting portion 19 is formed. The end portions 11 as a lamp insertion opening of the contact 2 have an oblique tapered shape in order to facilitate insertion of the ferrule 51 and to prevent buckling.

Each of the pair of first spring portions 12 has a portion formed into a semicircular shape. Therefore, the first spring portions have a contact shape capable of holding the ferrule 51 in contact therewith and positioning the lamp 52 in a height direction (Y-direction) after insertion of the lamp (CCFL tube) 52.

Further, formation of the second spring portions 13 enables absorption of impact in the height direction (Y-direction) of the lamp 52 in view of vibration resistance and impact resistance.

The inverter-side connecting portion 19 as a second connecting portion comprises an inverter-side base portion 17 connected to the floating portion 15, and a pair of third spring portions 16 each of which has a generally S shape and which extend downward from a lower end of the inverter-side base portion 17 at two points in a width direction, bend to extend upward, and then bend downward to form a mountain shape.

In order to enhance contact reliability, the pair of third spring portions 16 are formed as two parts branched from the inverter-side base portion 17 and arranged in parallel with each other. For the purpose of enhancing contact reliability by providing different resonance frequencies during oscillation, the pair of third spring portions 16 have respective shapes with spring characteristics different from each other, that is, the spring portions are given different widths.

It is noted here that, in order to provide different resonance frequencies, the spring portions may have different thicknesses or different lengths. Alternatively, a combination thereof may be used.

The inverter-side base portion 17 is provided with press-fit portions 17a formed on opposite sides thereof and serving as holding portions for press-fitting and fixing the contact 2 in a receiving portion of the housing 1 and chamfered portions 17b formed at opposite lower ends thereof for facilitating guiding upon press-fitting.

Figure 10:
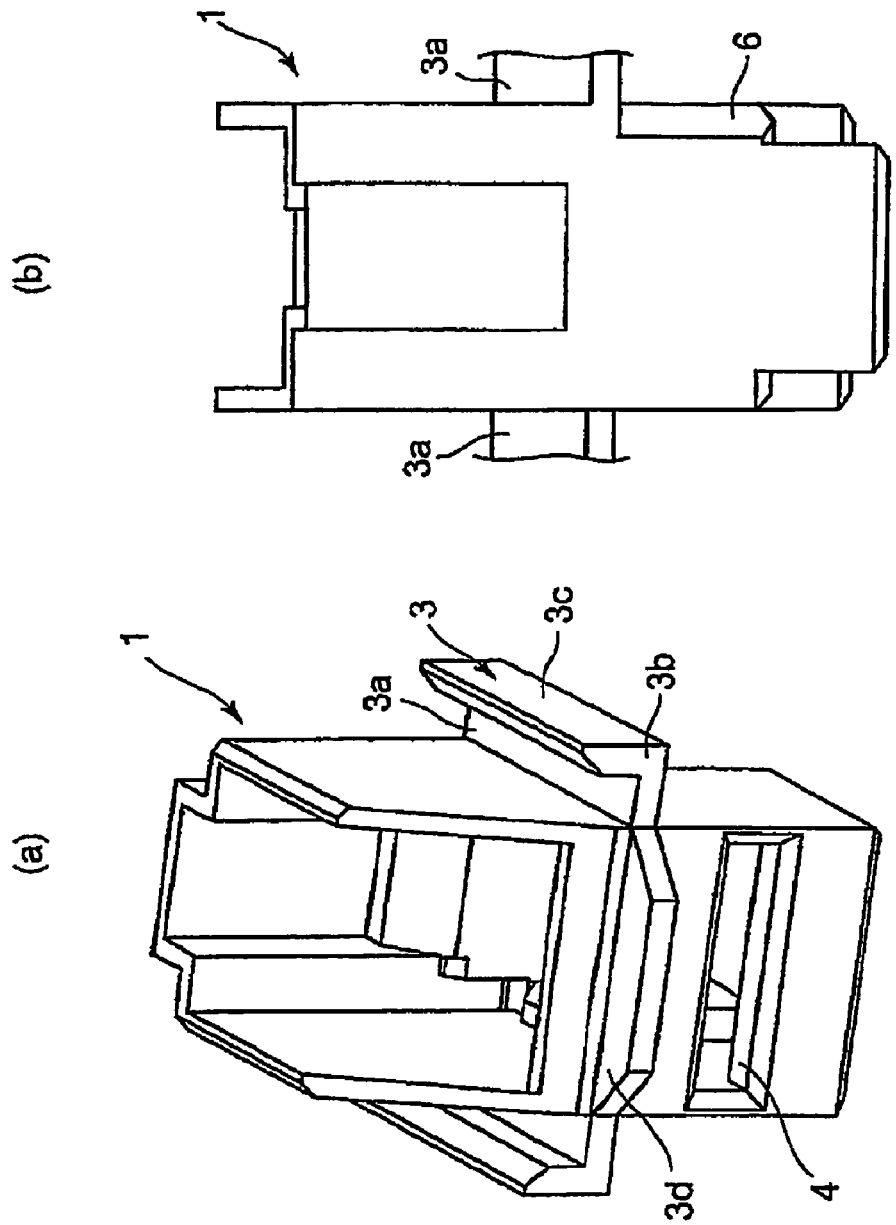
FIG. 10 shows (a) a perspective view of a housing 1 in FIG. 7 and (b) a rear view of the housing 1 in FIG. 7.
Figure 12:
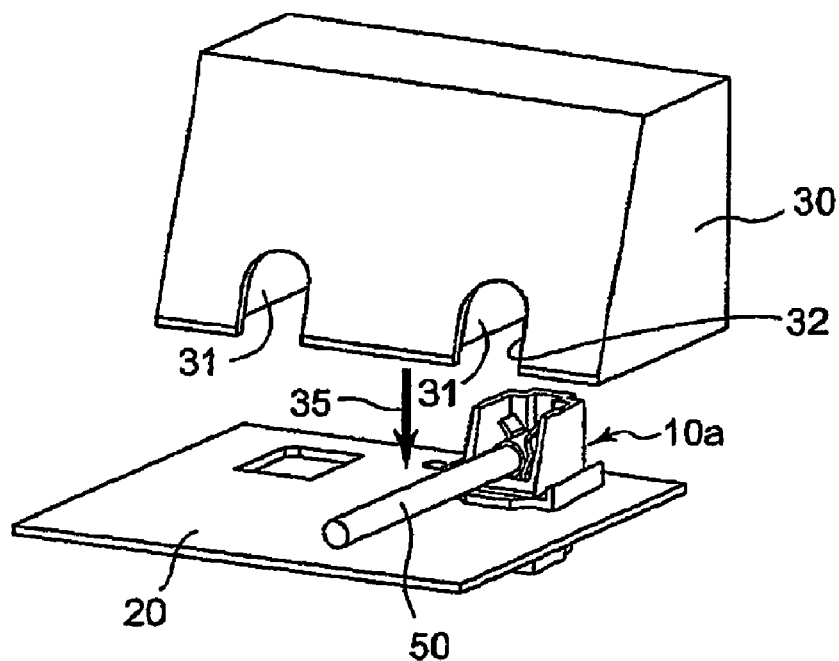
FIG. 12 is a perspective view for use in describing assembling of the backlight assembly using the connector in FIG. 7.

Referring to FIG. 10 (a), (b) and FIG. 12, the housing 1 has a box shape and has a structure formed in a space between a sheet metal and a support base to suppress a movement in a Y direction. Specifically, the housing has protruding portions 3 having an L-shaped section and formed on opposite sides thereof to serve as pressing portions when the housing is inserted into the support base and the sheet metal, and a trapezoidal-shaped projecting portion 3d formed on a front side thereof. Each of the protruding portions 3 comprises a horizontal portion 3b and a rising portion 3c having a tapered portion formed inside, thereby forming a groove 3a adapted to receive a rib 31 (see FIG. 12). By the tapered portion, the rib 31 is guided to be inserted into the groove 3a.

At a lower portion of the housing 1, the insertion opening 4 for the inverter substrate 40 to be inserted therein is opened. The insertion opening 4 has a tapered shape in view of insertability of the inverter substrate 40.

Furthermore, the housing 1 has a press-fit opening allowing the contact 2 to be incorporated therein. The press-fit opening (not shown in the figure) has a tapered shape in view of insertability of the contact 2.

In order to prevent wrong insertion to the sheet metal 20, the housing has a "C" surface 6 formed at one corner portion.

Figure 11:
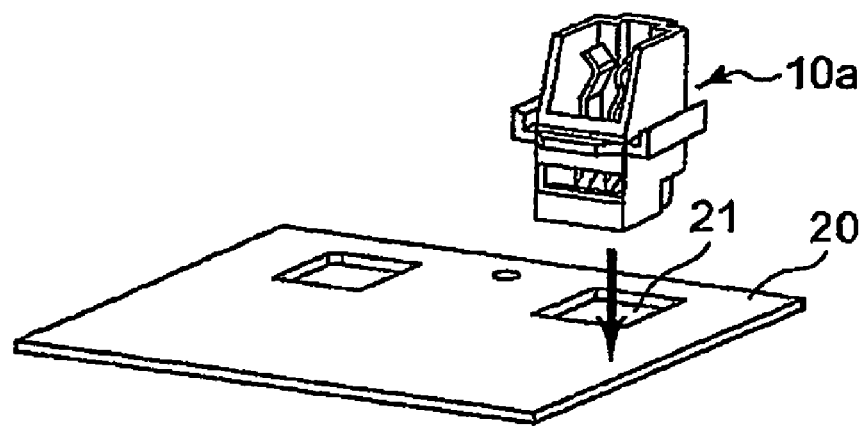
FIG. 11 shows (a) (b) perspective views for use in describing assembling of to a backlight assembly using in connector in FIG. 7.
Figure 11:
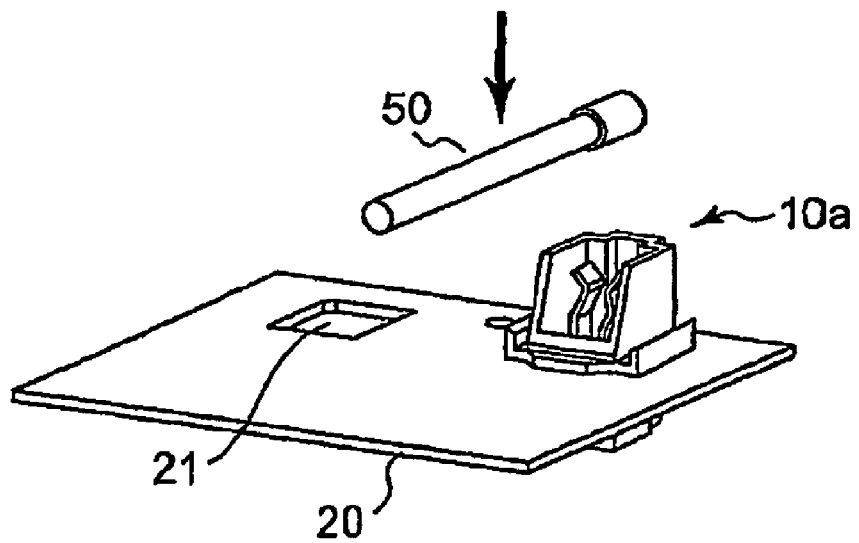

As shown in FIG. 11 (a), the connector 10a is inserted into a rectangular hole 21 of the sheet metal 20. At that time, the connector 10a is not fixed to the sheet metal 20. Next, as shown in FIG. 11 (b), the fluorescent tube 50 is mounted to the contact contact 2.

Next, as depicted by an arrow 35 in FIG. 12, a trapezoidal-shaped support base 30 is mounted which is provided with cutouts 32 formed on an elevation surface thereof to avoid the fluorescent tube 50. Herein, a combination of the sheet metal 20 and the support base 30 is called a casing.

Figure 13:
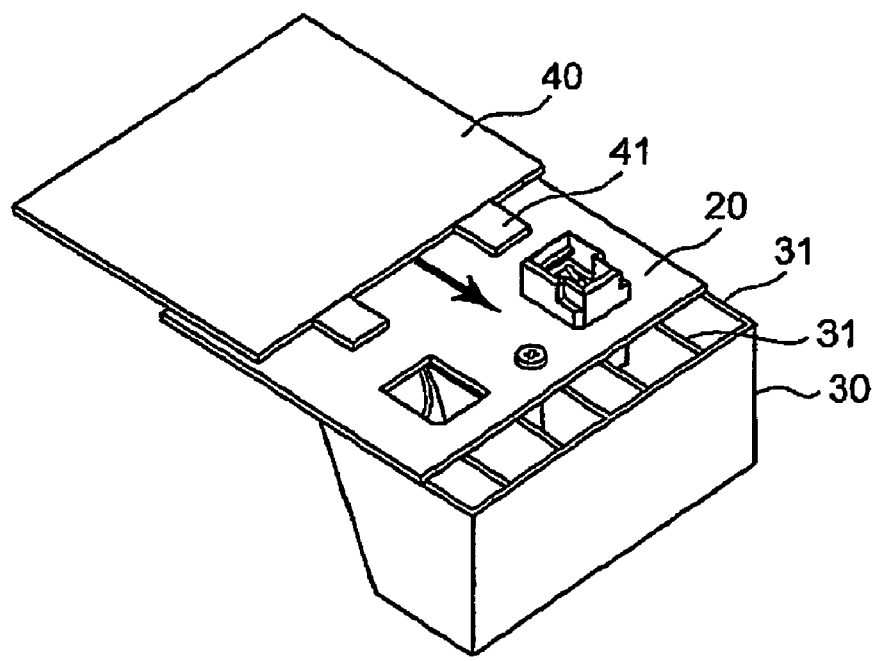
FIG. 13 is a perspective view for use in describing assembling of the backlight assembly using the connector in FIG. 7 as seen from a rear side.

Further, as shown in FIG. 13, the inverter substrate 40 is inserted into the insertion opening (connection of a card-edge structure). Thus, assembling of a backlight assembly 25 is completed.

Figure 14:
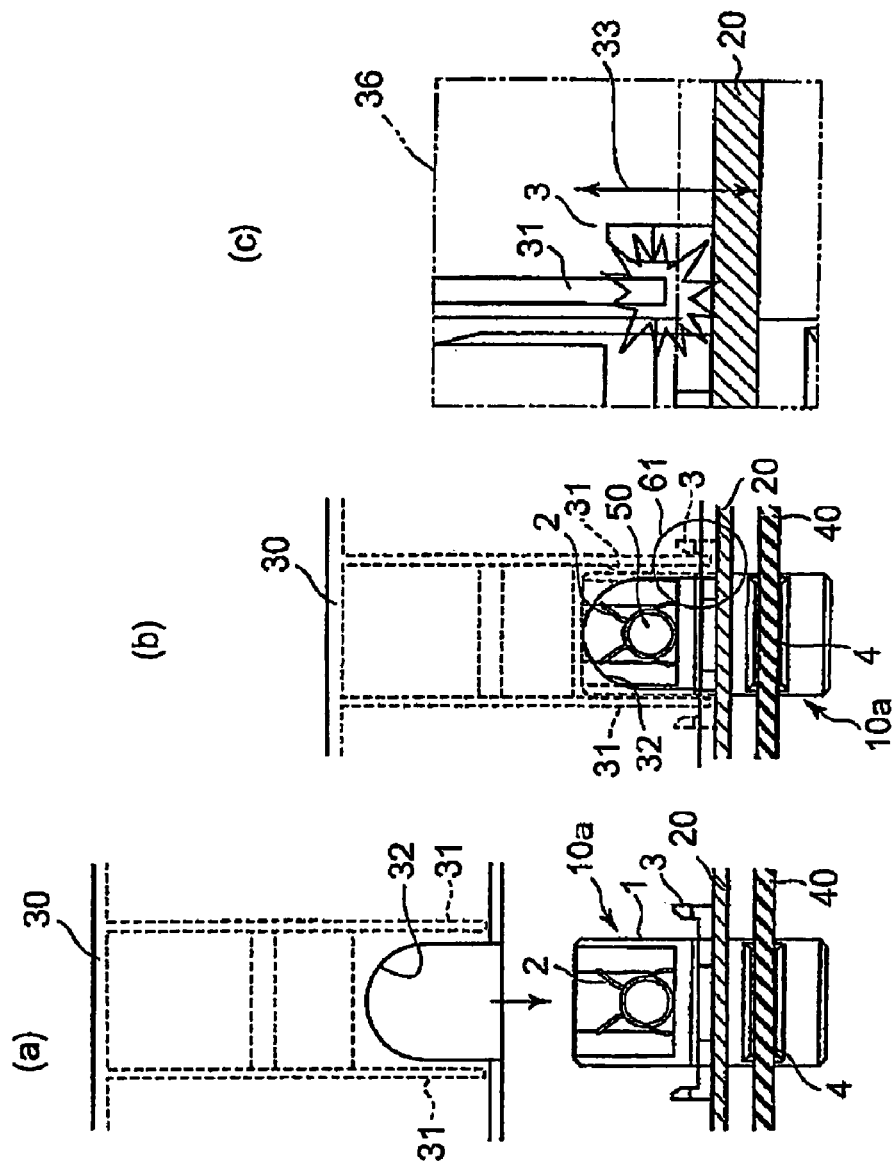
FIG. 14 shows (a) (b) front views for use in describing a function of a support base and (c) an enlarged view of a part depicted by a reference numeral 61 in (b).

Referring to FIG. 14 (a), inside the support base, plate-like ribs 31 extending downward are formed. The ribs 31 are arranged at a distance generally equal to a width of the connector 10a. As shown in FIG. 14 (b), the ribs 31 are inserted into the grooves 3a inside the protruding portions. In FIG. 14 (c) which is an enlarged view showing only a part depicted by a reference numeral 36 and cut from an area depicted by a reference numeral 61 in FIG. 14 (b), vertical movement of the connector 10a is suppressed.

Figure 15:
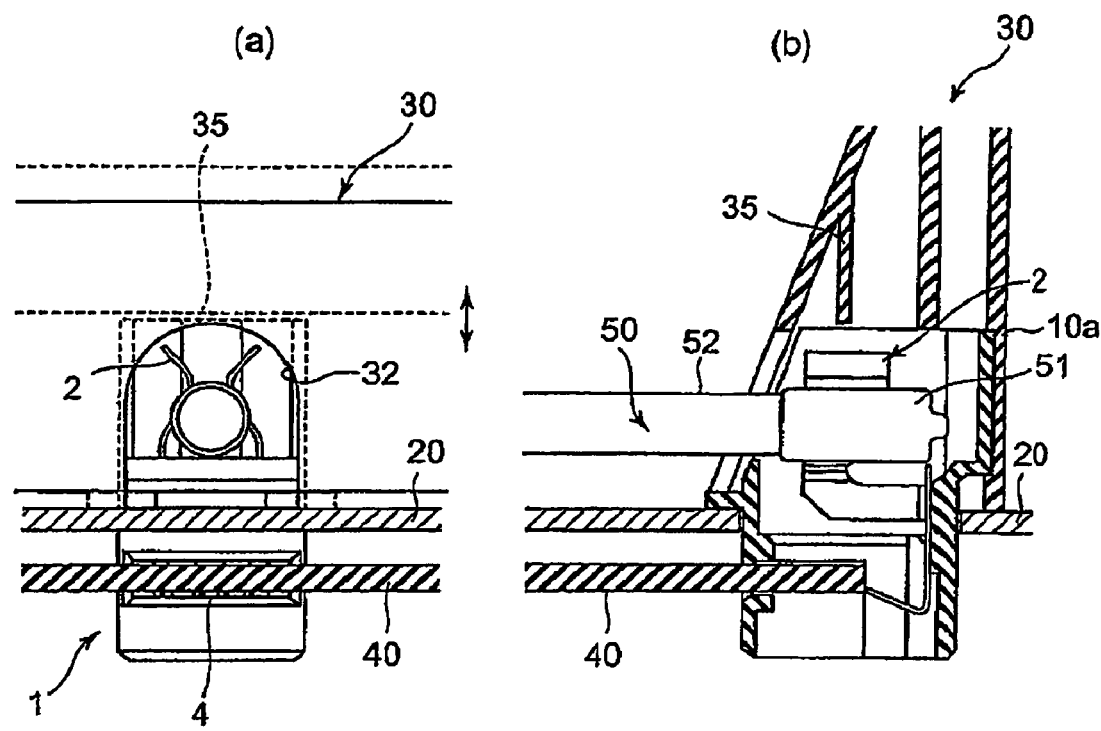
FIG. 15 shows a modified example of the support base, (a) being a front view, (b) being a side sectional view.

Referring to FIG. 15 (a), (b), inside the support base 30 according to a modified example, a rib 35 is formed to press an upper surface of the connector 10a. The rib 35 also can suppress vertical movement of the connector 10a.

As mentioned above, in the first embodiment of the present invention, connection between the fluorescent tube 50 (ferrule 51) and the inverter substrate 40 is connectorized. Therefore, man-hours for an operation of soldering can be reduced.

Further, in the first embodiment of the present invention, an operation of replacing the fluorescent tube 50 becomes easy. Accordingly, many man-hours for a replacing operation and replacement of other parts as required in a conventional technique become unnecessary.

In the structure according to the first embodiment of the present invention, the ferrule 51 is provided so that the Dumet wire 53 of the fluorescent tube 50 is not directly loaded. Therefore, possibility of occurrence of cracks in glass is reduced and long-term stable lighting of the lamp is enabled.

Further, according to the first embodiment of the present invention, the connector 10a is directly inserted into the sheet metal 20 without performing the operation of inserting the connector into the coupling plate and fixing the coupling plate to the sheet metal as in Patent Document 2. Therefore, man-hour reduction is enabled.

Furthermore, according to the first embodiment of the present invention, the operation of fitting the holder cap as in Patent Document 2 becomes unnecessary.

Further, according to the first embodiment of the present invention, connection reliability is ensured even in occurrence of a positioning error or a E error between the casing and the connector or between the connector and the fluorescent tube during mounting of the connector and during assembling of the substrate because the lamp 52 is not directly loaded and a floating terminal configuration having a floating portion absorbing the e error is used.

Second Embodiment

Figure 16:
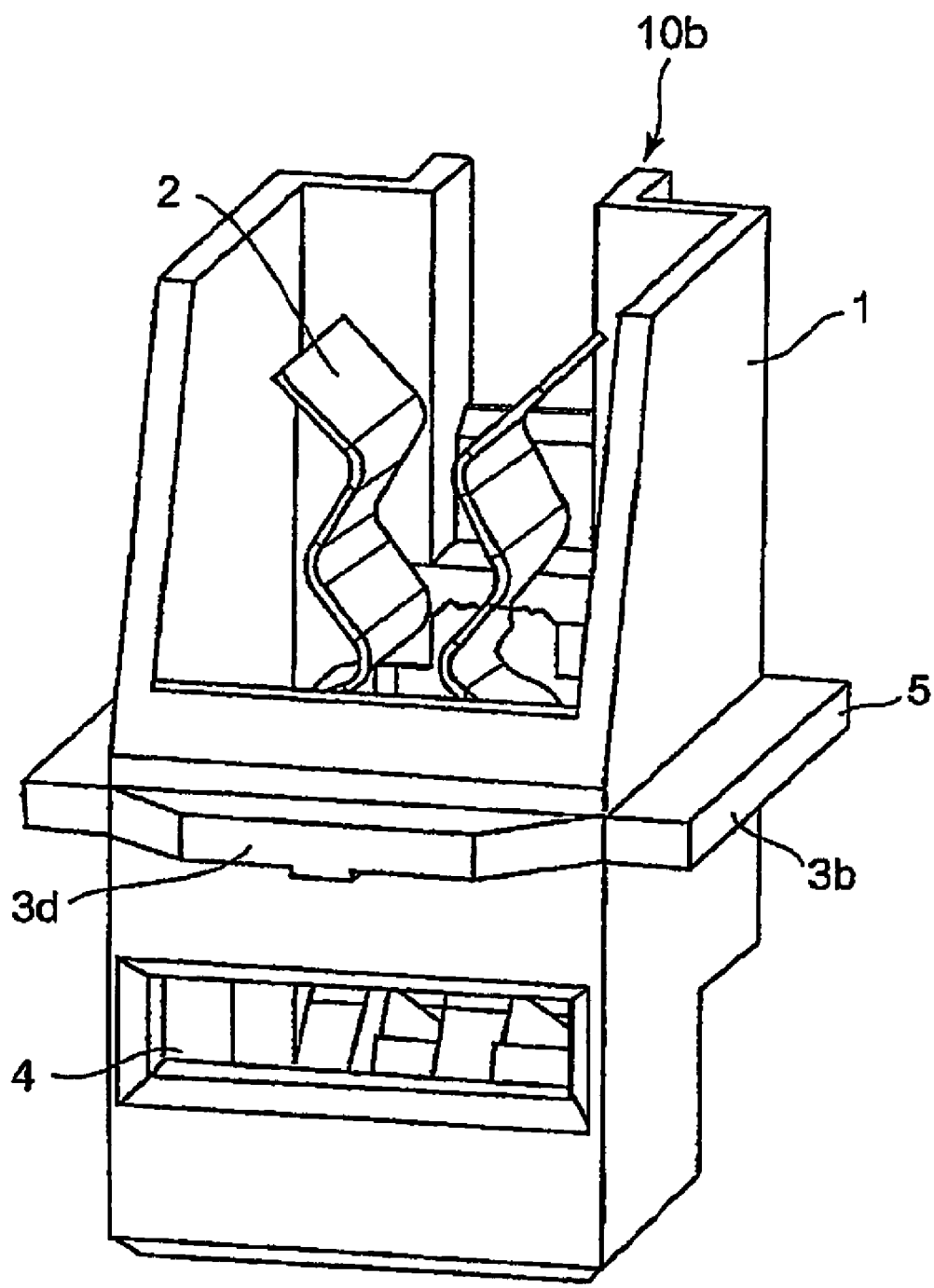
FIG. 16 is a perspective view showing a structure of a connector according to a second embodiment of the present invention.
Figure 17:
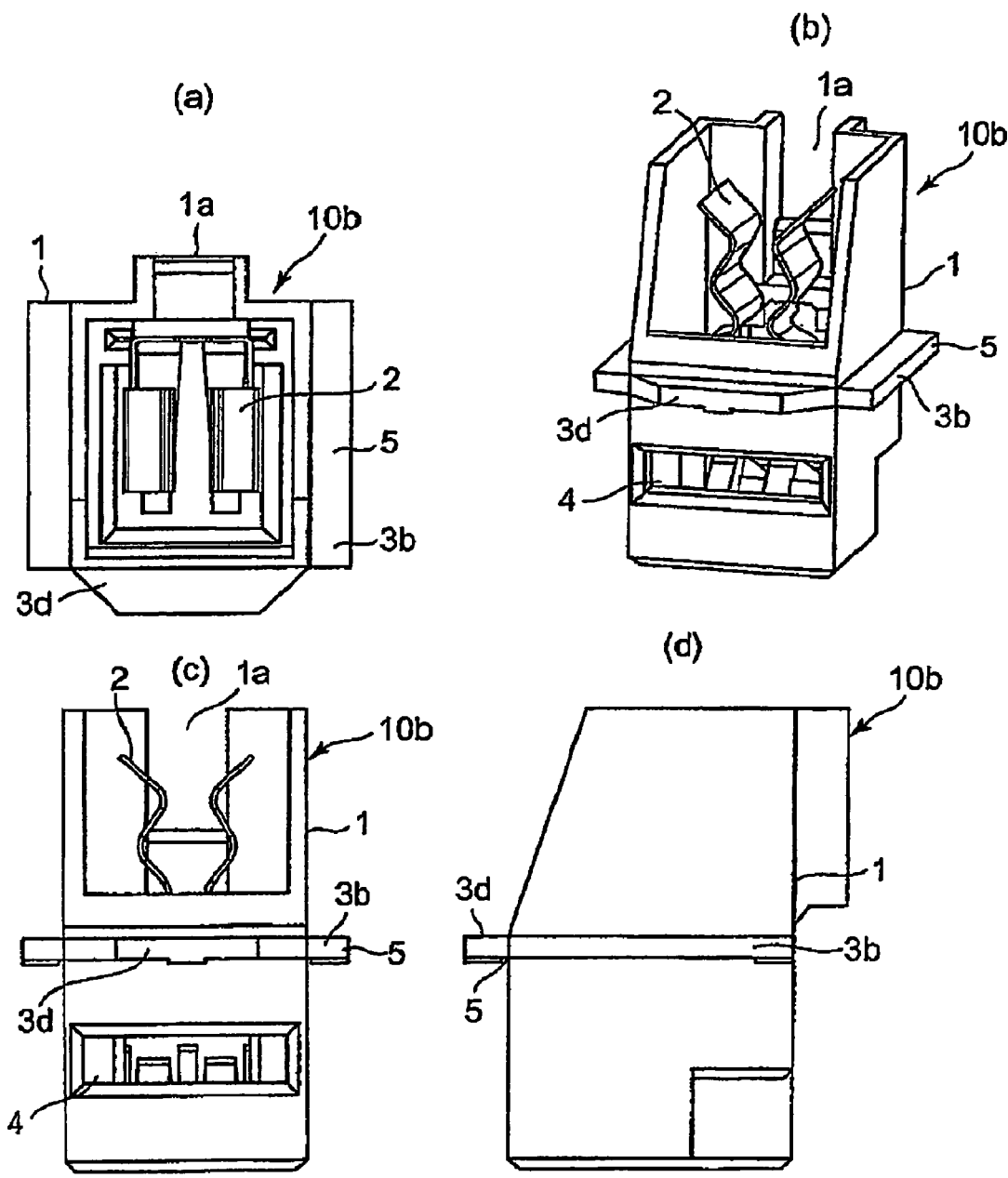
FIG. 17 shows (a) a top view of the connector in FIG. 16, (b) a perspective view of the connector in FIG. 16, (c) a front view of the connector in FIG. 16, and (d) a side view of the connector in FIG. 16.

Referring to FIG. 16 and FIG. 17 (a)-(d), a connector 10b according to a second embodiment of the present invention has the housing 1 formed of an insulating material having a high thermal resistance (approximately 160° C.) in view of heat buildup of an electrode portion of the lamp 52, and the metal contact 2 having an excellent conductivity. The metal contact 2 is used for connection between the fluorescent tube (CCFL tube) 50 and the inverter substrate 40 (see FIGS. 13, 14, and 15). The fluorescent tube 50 has one end which is inserted into the contact. As will later be described, the inverter substrate 40 is inserted into the insertion opening 4 opened at a lower portion of the connector so as to be brought into contact with the other end of the contact.

The contact 2 is similar in structure to that described in connection with FIG. 9 (a), (b).

The housing 1 of the connector 10b according to the second embodiment of the present invention is different from that of the first embodiment in that a protruding portion 5 does not have the rising portion 3c and the groove 3a and has the horizontal portion 3b.

Specifically, the housing 1 has a box shape and has a structure formed in a space between a sheet metal and a support base to suppress a Y direction. In detail, the housing has the protruding portions 5 formed on opposite sides thereof to serve as pressing portions when the housing is inserted into the support base and the sheet metal and the trapezoidal-shaped projecting portion 3d formed on a front side thereof. Each of the protruding portions 5 has the horizontal portion 3b.

At a lower portion of the housing 1, the insertion opening 4 for the inverter substrate 40 to be inserted therein is opened. The insertion opening 4 has a tapered shape in view of insertability of the inverter substrate 40.

Furthermore, the housing 1 has a press-fit opening allowing the contact 2 to be incorporated therein. The press-fit opening (not shown in the figure) has a tapered shape in view of insertability of the contact 2.

In order to prevent wrong insertion to the sheet metal 20, the housing has a "C" surface 6 (see FIG. 21) formed at one corner portion.

Figure 18:
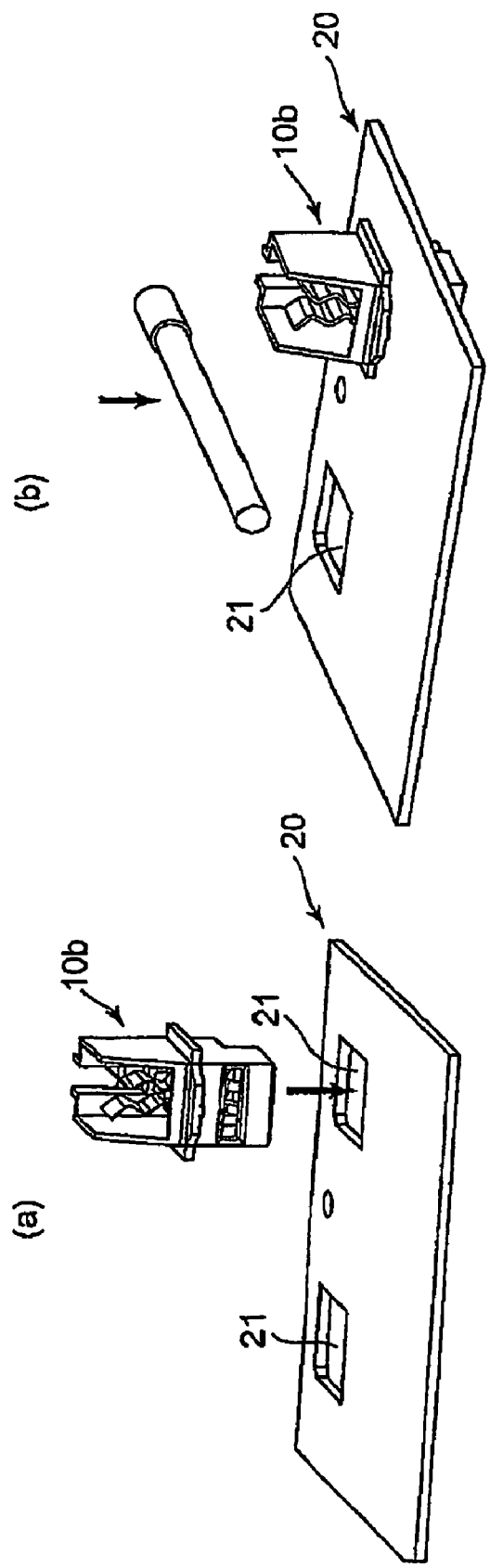
FIG. 18 shows (a) (b) perspective views for use in describing assembling of a backlight assembly using the connector in FIG. 16.
Figure 19:
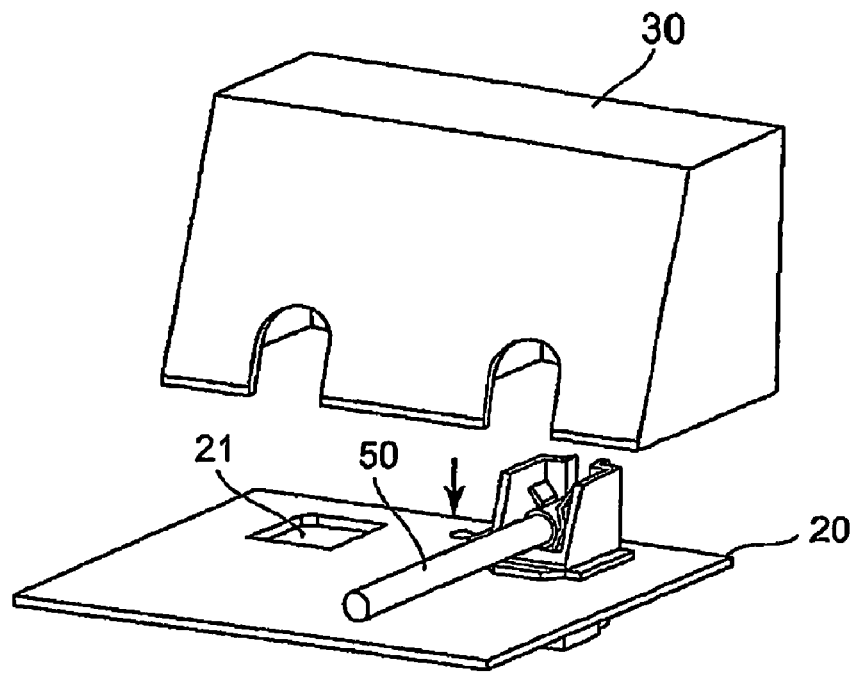
FIG. 19 is a perspective view for use in describing assembling of the backlight assembly using the connector in FIG. 16.
Figure 20:
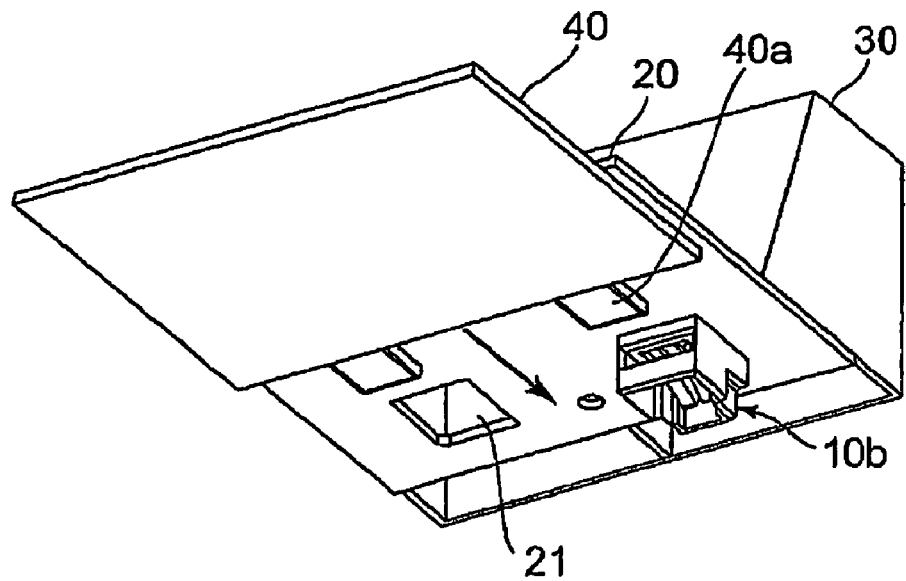
FIG. 20 is a perspective view for use in describing assembling of the backlight assembly using the connector in FIG. 16 as seen from a rear side.
Figure 21:
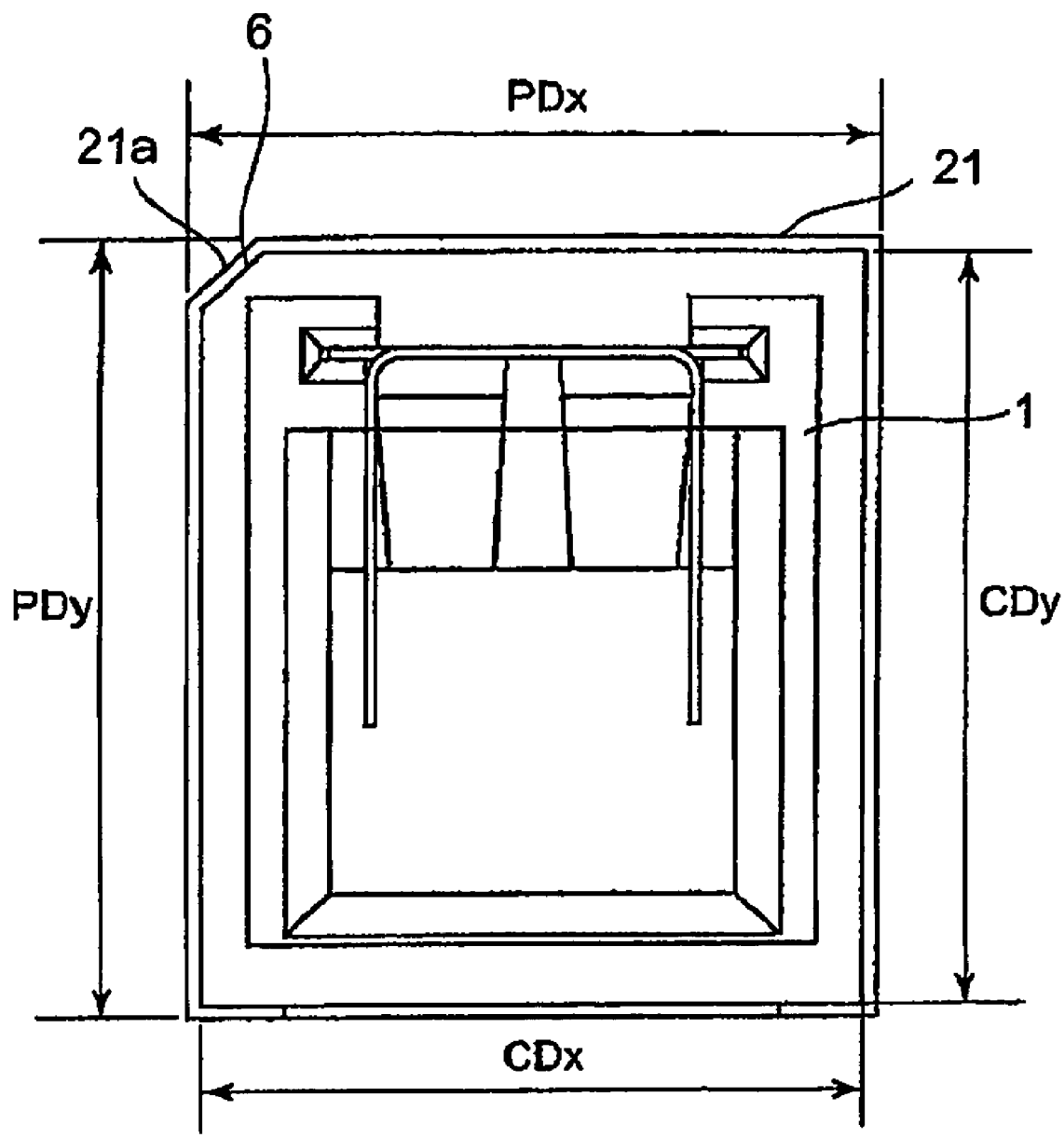
FIG. 21 is a view showing a connector insertion hole of a sheet metal, in which only a part of a contact is shown and the other parts are omitted.
Figure 22:
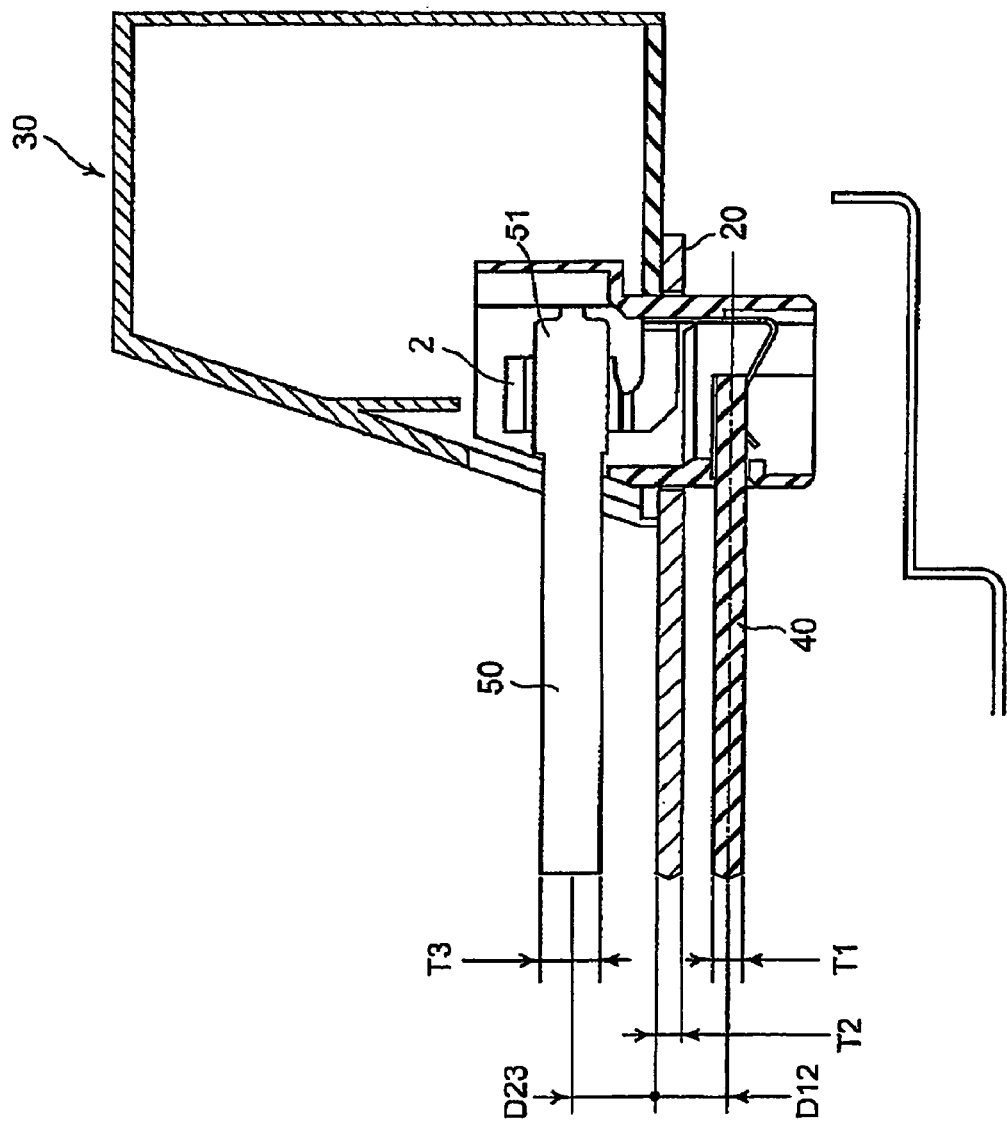
FIG. 22 is a sectional view showing a completed state of the backlight assembly.

FIG. 18 (a), (b) and FIG. 19 are perspective views for use in describing assembling of backlight assembly 26 using the connector in FIG. 16. FIG. 20 is a perspective view for use in describing assembling of the backlight assembly 26 using the connector in FIG. 16 as seen from a rear side. FIG. 21 is a view showing a connector insertion hole of the sheet metal, in which only a part of the contact 2 is shown and the other parts are omitted. FIG. 22 is a sectional view showing a completed state of the backlight assembly.

As shown in FIG. 18 (a), the connector 10b is inserted into the rectangular hole 21 of the sheet metal 20. At that time, the connector 10b is not fixed to the sheet metal 20. Next, as shown in FIG. 18 (b), the fluorescent tube 50 is mounted to the contact 2.

As shown in FIG. 21, the rectangular hole 21 has dimensions in X and Y directions, namely, sheet metal punching sizes (PDx and PDy) equal to, for example, 10.1 mm and 11.9 mm, respectively, while the connector has dimensions in X and Y directions (CDx and CDy) equal to, for example, 9.8 mm and 11.6 mm, respectively. Clearances are approximately equal to 0.3 mm in both X and Y directions. The rectangular hole 21 has a corner angled portion 21a which is inwardly projected into a beveled shape. Furthermore, the connector 10b has the chamfered C surface 6 at one corner portion thereof. The C surface 6 of the connector 10b and the corner angled portion 21a are formed to prevent wrong insertion of the connector 10b into the rectangular hole 21.

Next, as shown in FIGS. 19 and 20, the trapezoidal-shaped support base 30 is mounted. Herein, a combination of the sheet metal 20 and the support base 30 is called a casing.

As shown in FIG. 20, the inverter substrate 40 is slidingly inserted into the insertion opening as depicted by an arrow. Thus, connection of a card edge structure is achieved and assembling of the backlight assembly 26 is completed.

The backlight assembly 26 after completion of assembling has respective specific dimensions as shown in FIG. 22, for example, a thickness T1 of the inverter substrate 40 is equal to 1.6 mm, a thickness T2 of the sheet metal 20 is equal to 1.2 mm, a diameter T3 of the fluorescent tube is equal to 3.4 mm, a distance D12 from the center of the inverter substrate 40 to an upper surface of the sheet metal 20 is equal to 4 mm, and a distance D23 from the center of the fluorescent tube to the upper surface of the sheet metal 20 is equal to 5 mm.

Figure 23:
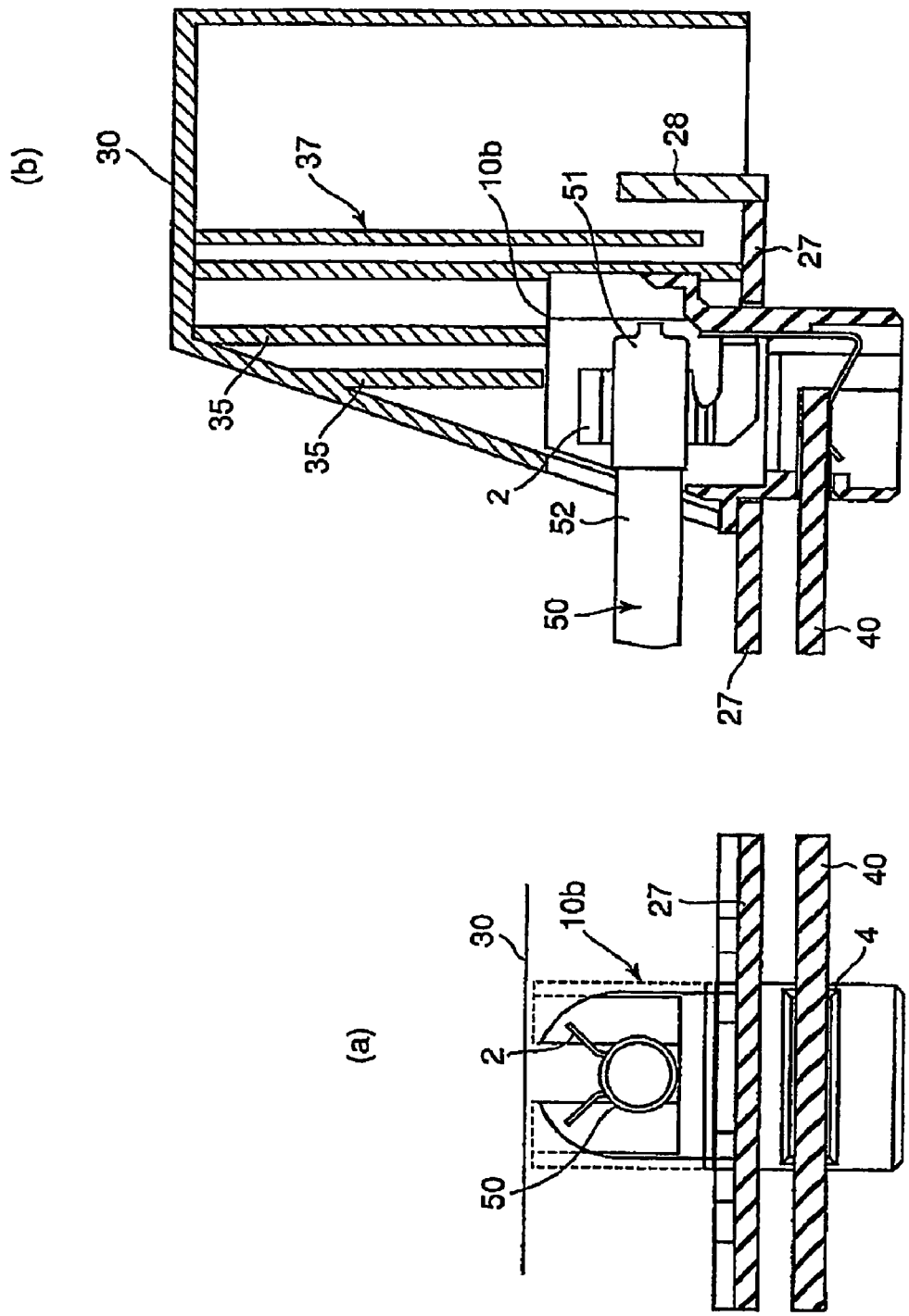
FIG. 23 shows (a) a front view showing a modified example of the backlight assembly in FIG. 22 and (b) a sectional view of the modified example of the backlight assembly in FIG. 22.

FIG. 23 illustrates (a) a front view and (b) a sectional view showing a modified example of the backlight assembly in FIG. 22, respectively. As shown in FIG. 23 (a), (b), also when a substrate 27 is used in place of the sheet metal 20, vertical movement of the connector is suppressed by pressing a ceiling surface by a protruding portion of the support base 30.

As shown in FIG. 23 (b), when a sheet metal 28 is arranged rearward the connector, a clearance of not less than 6 mm is formed between a rear surface of the connector 10b and the sheet metal 28. Instead of forming a distance between the rear surface of the connector 10b and the sheet metal 28, the support base may be provided with a partition wall 37 protruding downward.

As described in the foregoing, in the second embodiment of the present invention, connection between the fluorescent tube (ferrule 51) and the inverter substrate 40 is connectorized. Therefore, man-hours for an operation of soldering can be reduced.

Further, in the second embodiment of the present invention, an operation of replacing the fluorescent tube 50 becomes easy. Accordingly, many man-hours for a replacing operation and replacement of other parts as required in a conventional technique become unnecessary.

In the structure according to the second embodiment of the present invention, the ferrule 51 is provided so that the Dumet wire 53 of the fluorescent tube 50 is not directly loaded. Therefore, possibility of occurrence of cracks in glass is reduced and long-term stable lighting of the lamp is enabled.

Further, according to the second embodiment of the present invention, the connector is directly inserted into the sheet metal 20 without performing the operation of inserting the connector into the coupling plate and fixing the coupling plate to the sheet metal as in Patent Document 2. Therefore, man-hour reduction is enabled.

Furthermore, according to the second embodiment of the present invention, an operation of fitting the holder cap as in Patent Document 2 becomes unnecessary.

Further, according to the second embodiment of the present invention, connection reliability is ensured even in occurrence of a 0 error during mounting of the connector and during assembling of the substrate because the lamp 52 is not directly loaded and a floating terminal configuration having a floating portion absorbing the θ error is used.

INDUSTRIAL APPLICABILITY

As mentioned in the foregoing, the connector and the backlight assembly of the present invention are applicable to a backlight assembly of a liquid crystal panel of a liquid crystal television or the like.

This application claims priority based on Japanese Patent Application No. 2007-163396 filed on Jun. 21, 2007, the disclosure of which is incorporated herein in its entirety.

The invention claimed is:

1. A backlight assembly comprising:
   a fluorescent tube having a connecting portion;
   a connector connected to the connecting portion of the fluorescent tube;
   a substrate connected to the connector; and
   a casing holding the connector,
   wherein the fluorescent tube comprises a ferrule covering one end of the fluorescent tube as a contacting portion and the connector comprises a contact and a housing holding the contact;
   wherein the contact comprises a holding portion held by the housing, a first connecting portion connected to the connecting portion of the fluorescent tube, and a second connecting portion connected to the substrate;
   wherein the first connecting portion comprises a pair of end portions to guide the ferrule, a pair of spring portions connected to the pair of end portions and a base portion to connect the pair of spring portions to each other,
   the pair of spring portions having an L-shape as seen from a direction to which the pair of spring portions oppose, and
   the pair of spring portions also having an L-shape as seen from a direction along a width of the pair of spring portions.

2. The backlight assembly as claimed in claim 1, wherein the casing comprises a sheet metal and a support base, the connector is held in a loosely-fitted state by the sheet metal and the support base, and the pair of spring portions have a shape which enables positioning of the fluorescent tube.

3. The backlight assembly as claimed in claim 2, wherein the second connecting portion includes a pair of spring portions, each of the spring portions comprises a contact point and a fixed end, and the spring portions are different from each other in width of a part from the contact point to the fixed end.

4. The backlight assembly as claimed in claim 1, wherein the second connecting portion includes a pair of spring portions, each of the spring portions comprises a contact point and a fixed end, and the spring portions are different from each other in width of a part from the contact point to the fixed end.

5. A connector for use in connecting a fluorescent tube and a substrate, the fluorescent tube comprising a ferrule covering one end of the fluorescent tube as a contacting portion, the connector comprising a contact and a housing holding the contact; wherein the contact comprises:
   a holding portion held by the housing;
   a first connecting portion connected to a connecting portion of the fluorescent tube; and
   a second connecting portion connected to the substrate;
   wherein the first connecting portion comprises a pair of end portions to guide the ferrule, a pair of spring portions connected to the pair of end portions and a base portion to connect the pair of spring portions to each other,
   the pair of spring portions having an L-shape as seen from a direction to which the pair of spring portions oppose, and
   the pair of spring portions also having an L-shape as seen from a direction along a width of the pair of spring portions.

6. The connector as claimed in claim 5, wherein the pair of spring portions have a shape which enables positioning of the fluorescent tube.

7. The connector as claimed in claim 6, wherein the second connecting portion includes a pair of spring portions, each of the spring portions comprises a contact point and a fixed end, and the spring portions are different from each other in width of a part from the contact point to the fixed end.

8. The connector as claimed in claim 5, wherein the second connecting portion includes a pair of spring portions, each of the spring portions comprises a contact point and a fixed end, and the spring portions are different from each other in width of a part from the contact point to the fixed end.

* * * * *